United States Patent
Bair et al.

(12)

(10) Patent No.: US 6,294,048 B1
(45) Date of Patent: *Sep. 25, 2001

(54) METHOD FOR REGENERATING SODIUM HYDROXIDE BY PARTIAL AUTOCAUSTICIZING SODIUM CARBONATE CONTAINING SMELT BY REACTION WITH A BORATE

(75) Inventors: Charles M. Bair, Thousand Oaks; Robert B. McBroom, Santa Clarita, both of CA (US); Honghi N. Tran, Toronto (CA)

(73) Assignee: U.S. Borax Inc., Valencia, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/238,828

(22) Filed: Jan. 28, 1999

Related U.S. Application Data

(60) Provisional application No. 60/087,779, filed on Jun. 1, 1998.

(51) Int. Cl.$^7$ .................................................. D21C 11/04
(52) U.S. Cl. .................. 162/29; 162/30.1; 162/30.11; 162/37; 162/38; 162/80; 162/90
(58) Field of Search .............................. 162/29, 37, 30.1, 162/38, 30.11, 90, 36, 80, 79, 32, 35

(56) References Cited

U.S. PATENT DOCUMENTS

| 2,146,093 | 2/1939 | Ritchie et al. . |
| 3,766,001 | 10/1973 | Gleason et al. . |
| 3,865,684 | 2/1975 | Gleason et al. . |
| 4,116,759 | 9/1978 | Janson . |

FOREIGN PATENT DOCUMENTS

| 1087355 | 10/1980 | (CA) . |
| 66033 | 12/1982 | (FI) . |
| 57161-189 | 3/1981 | (JP) . |

OTHER PUBLICATIONS

Janson, Jan, "The use of unconventional alkali in cooking and bleaching; Part 1. A new approach to liquor generation and alkalinity", Paperi ja Puu–Papper och Tra, vol. 59, No. 6–7, pp. 425–430, 1977.

Janson,Jan & Pekkala,Osmo, "The use of unconventional alkali in cooking and bleaching; Part 2. Alkali cooking of wood with the use of borate", Paperi ja Puu–Papper och Tra, vol. 59, No. 9, pp 546–557, 1977.

Janson,Jan & Pekkala,Osmo, "The use of unconventional alkali in cooking and bleaching; Part 3. Oxygen–alkali cooking and bleaching with the use of borate", Paperi ja Puu–Papper och Tra, vol. 60, No. 2, pp. 89–93, 1978.

Janson,Jan, "The use of unconventional alkali in cooking and bleaching; Part 4. Kraft Cooking with the use of borate", Paperi ja Puu–Papper och Tra, vol. 60, No. 5, pp. 349–357, 1978.

Janson,Jan, "The use of unconventional alkali in cooking and bleaching; Part 5. Autocausticizing reactions", Paperi ja Puu–Papper och Tra, vol. 61, No. 1, pp. 20–30, 1979.

Janson,Jan, "The use of unconventional alkali in cooking and bleaching;Part 6. Autocausticizing of sulfur–containing model mixtures & spent liquors", Paperi ja Puu–Papper och Tra, vol. 61, No. 2, pp. 98–103, 1979.

Janson,Jan, "Autocausticizing alkali and its use in pulping and bleaching", Paperi ja Puu–Papper och Tra, vol. 61, No. 8, pp. 495–504, 1979.

Markham,L.D., "Use of Borax in Oxygen Pulping", Trans. Tech. Sect. Canadian Pulp Paper Assoc., vol. 4, No. 4, Tr/110–115, 1978.

Janson,J., "Pulp processes based on autocausticizable borate", Svensk Papperstidning, Finnish Pulp and Paper Institute, Finland, vol. 83, No. 14, pp. 392–395, 1980.

"An evaluation of nonconventional causticizing technology for kraft chemical recovery", A Progress Report to Members of the Institute of Paper Chemistry, Institute of Paper Chemistry, Appleton, Wisconson, pp. 1–66, Jan. 30, 1981.

Janson,Jan and Arhippainen, Bengt, "Mill scale development of the borate–based kraft pulping process", International Conference on Recovery Pulping Chemistry, Vancouver, BC, Canada, pp 205–210, 1981.

Kinzer,K., "Wood Pulping with self–causticizing borate", Chemical Abstracts, vol. 100, 23687b, 1983.

Kinzer,K., "Untersuchngnen zum Holsaufschloss mit selbstkaustizierndem Borat", Zellstoff und Papier, vol. 32, No. 5, pp. 202–207, 1983, (with Translation—"Investigation into Wood Decomposition with Autocausticizing Borate").

Sozen,G. and Pinder,K., "The autocausticizing of sodium carbonate with colemanite", Chemical Abstracts, vol. 107, 136139n, 1985.

(List continued on next page.)

Primary Examiner—Steve Alvo
(74) Attorney, Agent, or Firm—Kurt R. Ganderup

(57) ABSTRACT

A method is provided for the use of borates in the recausticization of alkali-containing liquors such as those produced in the chemical and semi-chemical pulping of wood and in the oxidation and bleaching of wood pulp. Sodium hydroxide is regenerated from sodium carbonate-containing smelts in such pulp processes by autocausticization through the addition of limited amounts of borate. Autocausticization may be carried out at boron to carbonate molar ratios below 2:1 and at sodium to boron molar ratios exceeding 3:1, resulting in high reaction efficiency. Partial autocausticization using borate may also be combined with conventional lime recausticization for the regeneration of sodium hydroxide from sodium carbonate-containing smelts.

12 Claims, No Drawings

OTHER PUBLICATIONS

Sozen,G. and Pinder, K., "The autocausticizing of sodium carbonate with colemanite", Appl.Chem.Eng.Princ.For.Prod.Relat.Ind., (Pap. Symp.), Am.Inst.Chem.Eng., Forest Prod.Div., Tacoma,WA, vol. 1, pp. 9–20, 1986.

Janson,Jan and Soderhjelm, Liva, "The viscosity of borate–containing black liquor", Nordic Pulp and Paper Research Journal, No. 2, pp. 107–110, 1988.

Koran, Christine; Wandelt, Pawel; and Kubes, George J., "The effect of temperature on borate–based kraft cooking of black spruce", Chemical Abstracts, vol. 126; 90882m, 1985.

Koran, Christine; Wandelt, Pawel; and Kubes, George J., "The effect of temperature on borate–based kraft cooking of black spruce", Paperi ja Puu–Paper and Timber, vol. 78, No. 9, pp. 541–544, 1996.

Prihoda, Susanne; Wandelt, Pawel; and Kubes, George J., "The effect of borates on kraft, kraft–AQ and soda–AQ cooking of black spruce".

Tran, Honghi; Mao, Xiaosong; Cameron, John; and Bair, Charles M., "Autocausticizing of smelt with sodium borates", Int. Chem. Recovery Conf., Toronto, Canada, TAPPI Press, Atlanta, Georgia, vol. 2, pp. 841–852, Jun. 1, 1998.

Tran, Honghi; Mao, Xiaosong; Cameron, John; and Bair, Charles M., "Autocausticizing fo smelt with sodium borates", Chemical Abstracts vol. 129, 277541d, 1998.

Emile Carriere, Henri Guiter, and Francis Thubert, "The Action of Boric Anhydride on Sodium Carbonate", Chemical Abstracts, vol. 44, No. 3828, (1950).

Emile Carriere, Henri Guiter, and Francis Thubert, "Action de l'anhydride borique sur le carbonate de sodium", Bull. Soc. Chim. France, 5, 16, p. 796–801, (1949).

"The action of boric oxide on sodium carbonate", an informal translation of Citation No. 29 by Emile Carriere, Henri Guiter and Francis Thubert, "Action de l'anhudride borique sur le carbonate de sodium", Bull. Soc. Chim. France, 5, 16, p. 796–801, (1949).

METHOD FOR REGENERATING SODIUM HYDROXIDE BY PARTIAL AUTOCAUSTICIZING SODIUM CARBONATE CONTAINING SMELT BY REACTION WITH A BORATE

PROCESSES

This application claims the benefit of U.S. Provisional Application No. 60/087,779 filed Jun. 1, 1998.

This invention relates to the use of borates in the recausticization of alkali-containing liquors such as are produced in the chemical and semi-chemical pulping of wood and in the oxidation and bleaching of wood pulp, and more particularly to the partial autocausticization of such liquors by the addition of limited amounts of borate. It also relates to a process for complete recausticization of such liquors by a combination of partial autocausticization using borate with conventional lime recausticization.

BACKGROUND OF THE INVENTION

There are a variety of processes which utilize alkali-based chemicals such as sodium hydroxide in the pulping, bleaching or oxidation of wood materials. These processes include chemical and semi-chemical methods for breaking down wood chips or other wood-based starting materials into wood fiber for the production of paper, cardboard and similar cellulose-based products. Other processes which use such alkali-based chemicals include the oxidizing and bleaching of wood pulp for paper production.

In a typical chemical-based wood pulping process, such as the kraft process, wood chips are treated with an aqueous solution of mainly sodium hydroxide (caustic soda) to separate out lignin and other organic constituents which bind the cellulose fibers together in order that the wood can be broken down into individual fibers for various uses such as paper making. In the kraft process this solution also contains sodium sulfide. The sodium hydroxide reacts and combines chemically with lignin forming an organic-based solution referred to as black liquor or spent liquor. The black liquor is separated from the fiber and burned in a recovery boiler to recover heat from the organics. In the process of burning, the black liquor is converted into smelt, a molten phase in which the sodium-organic complex has been converted to sodium carbonate. In the kraft process sodium sulfide is also formed. In order to regenerate sodium for reuse in the pulping process, sodium carbonate must be converted back to sodium hydroxide or "recausticized". The molten smelt is typically dispersed with steam as it is poured into an aqueous solution, such as recycled dilute white liquor, weak wash or water, in which it dissolves to form a sodium carbonate solution referred to as green liquor due to the dark green appearance caused by the presence of an insoluble residue known as dregs. In some operations, such as in the soda process, the smelt is cooled and solidified prior to dissolution. The green liquor is sent to a causticizer where sodium carbonate is converted back to sodium hydroxide, thus producing "white liquor" for reuse in the wood pulping process. This process, known as causticization, is accomplished by the reaction of sodium carbonate with calcium hydroxide, also known as hydrated or slaked lime, in the green liquor. In the process of regenerating sodium hydroxide, the calcium hydroxide is converted to calcium carbonate, as a precipitate (also known as lime mud), which is then converted back to calcium hydroxide in a separate lime recovery circuit, also known as a lime recovery cycle, so that it can be reused in the causticizer again. In the lime recovery circuit calcium carbonate is burned in a kiln to drive off carbon dioxide as a gas, converting the calcium carbonate to calcium oxide, which is then hydrated with water in the green liquor to reform calcium hydroxide which can be reused in the causticization step.

An alternative method of recausticization which does not require the use of lime and the associated lime recovery process was developed in the 1970's by Jan Janson, a researcher in Finland (U.S. Pat. No. 4,116,759). Janson proposed that sodium carbonate in the smelt could be causticized automatically ("autocausticized") in the recovery boiler by the addition of borate to the wood pulping circuit, thus eliminating the need for subsequent recausticization by calcium hydroxide and the accompanying lime recovery circuit.

The chemical reactions proposed by Janson for the autocausticization process were:

(1) Cooking or bleaching (delignification):

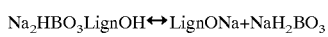

(2) Combustion:

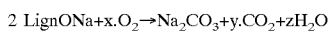

(3) Autocausticization:

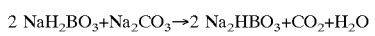

In autocausticizing, sodium metaborate acts like a catalyst, in that it will react with sodium carbonate in the smelt to produce a more basic disodium borate and carbon dioxide. When the disodium borate is dissolved in water, it is hydrolyzed to regenerate sodium hydroxide and the original sodium metaborate, hence eliminating the need for lime and the lime kiln and associated lime recovery cycle.

In a typical kraft process, sodium hydroxide is recovered for reuse in the process using the traditional lime recausticization methods described above. Autocausticization offers several potential benefits over recausticization with lime. These include elimination of the capital costs associated with the lime recovery circuit, reduction of energy costs by elimination of the need to burn the calcium carbonate to release carbon dioxide and elimination of other operating costs associated with the lime recovery circuit. Alternatively, in some operations, where sodium is not being recovered and reused in the process, autocausticization offers significant potential cost savings due to reduced chemical requirements, since borate is not used up in the process, but is instead returned to the start of the process for reuse along with the regenerated sodium hydroxide. However, Janson teaches in the '759 patent that it is essential to keep the sodium to boron molar ratio equal to or less than 2 (Na/B≦2) in order to ensure complete causticization.

Large scale trials (Janson, Jan and Bengt Arhippainen, "Mill Scale Development of the Borate-Based Kraft Pulping Process", International Conference on Recovery of Pulping Chemicals, Vancouver, British Columbia, Canada, Sep. 22–25, 1981) were conducted in the early 1980's to investigate the commercial applicability of autocausticization using borate. However, operating difficulties were encountered and the process was never adopted on a commercial basis. Such difficulties are largely related to changes in the physical properties of the black liquor due to the presence of high levels of borate, such as large increases in the dissolved solids content and viscosity, leading to difficulties with spraying and droplet size in the recovery boiler, reduced evaporation rate and the transporting of the liquor from the digestor to the recovery boiler. Also, a reduction in the heating value of the black liquor may require the addition of supplemental fuel in the recovery boiler.

Despite the potential benefits offered by autocausticization, it has not been adopted commercially in view of the problems associated with the process. It is an object of this invention to provide an improved causticization process which will provide some of the significant benefits of autocausticization, while minimizing the difficulties associated with it.

BRIEF DESCRIPTION OF THE INVENTION

This invention provides an improved method for causticizing sodium carbonate-containing smelt resulting from the combustion of black liquors, wherein a limited amount of borate is added such that only a portion of the sodium carbonate is autocausticized. The method of this invention provides reduced borate deadload in the circuit, resulting in improved recovery boiler operating conditions such as reduced black liquor viscosities and higher reaction efficiencies compared with full autocausticization at higher ratios of sodium to boron. This invention further provides a method for recausticization of sodium carbonate-containing smelts, wherein partial autocausticization is used in combination with lime recausticization to achieve improved conversion of sodium carbonate back to sodium hydroxide upon hydration of the smelt and lime recausticizing.

DETAILED DESCRIPTION OF THE INVENTION

According to this invention an improved process is provided for causticizing sodium carbonate-containing smelt at sodium to boron molar ratios exceeding 3:1, wherein the amount of borate used is less than the stoichiometric requirement for complete autocausticization of all of the alkali carbonate present in the black liquor. It has been found that the autocausticization reaction can proceed with unexpectedly high efficiencies under these conditions. Further, it has been observed that this process of partial autocausticization occurs at a rate which exceeds 100% stoichiometric efficiency at low levels of borate addition, based on the autocausticization reactions proposed in the '579 patent.

According to Janson's proposed reactions two moles of boron are consumed per mole of sodium carbonate recovered, as shown in equation (3) above. At boron addition levels equivalent to about 52% of the stoichiometric requirements for full autocausticization of sodium carbonate, and at a sodium to boron molar ratio of about 2.9:1, the observed reaction efficiencies averaged about 86%. However, in tests at low levels of borate addition, equivalent to 5% and 10% of full autocausticization requirements, the conversion of sodium carbonate to sodium hydroxide was determined to be 9–17% and 15–17%, respectively, which is significantly above the theoretical 100% reaction efficiency. The sodium to boron molar ratios in these tests were about 20:1 and 11:1, respectively. This suggests that under these conditions of low borate addition and high sodium to boron molar ratios the autocausticization reaction may lead to the formation of a different borate composition than was proposed in the '579 patent. In particular, the reaction product is believed to be $Na_3BO_3$ (trisodium borate), rather than $Na_2HBO_3$ (disodium borate, also written as $Na_4B_2O_5$) which was proposed by Janson. As a result, a higher level of autocausticization is achieved for a given level of borate used.

Partial autocausticization may occur to some extent in both the gas phase and the smelt. The reaction between borate and sodium carbonate can take place at temperatures as low as about 600° C. and can be carried out at temperatures up to at least 925° C. Temperatures in the lower furnace of a recovery boiler where partial autocausticization would be expected to occur can range from as low as about 700 to 850° C. in portions of the smelt to as high as 1100–1200° C. in the gas phase or char bed. Thus a broad temperature range in which partial autocausticization may be carried out is between about 600° and about 1200° C. Typically the partial autocausticization reaction will occur automatically in the recovery boiler following the combustion of the organic-based black liquor. The combustion reaction leading to the formation of sodium carbonate is shown in equation (2) above. In order to achieve maximum reaction efficiency, the method of this invention requires that the molar ratio of boron (B) to carbonate ($CO_3$) in the smelt, produced from combustion of the black liquor, be kept below 2:1, the stoichiometric requirement for full autocausticization according to equation (3), above. Preferably the boron to carbonate molar ratio is in the range of from about 0.01:1 to 1:1, more preferably in the range of from about 0.02:1 to 0.8:1, and most preferably in the range of from about 0.05:1 to 0.4:1. In addition, the molar ratio of sodium to boron should be above 3:1, preferably in the range of from about 4:1 to 400:1, more preferably in the range of from about 5:1 to 200:1 and most preferably in the range of from about 10:1 to 100:1. Under these conditions, the partial autocausticization reaction efficiency has been found to increase with increases in the sodium to boron ratio. However, very low boron to carbonate molar ratios, such as below about 0.01:1, and very high sodium to boron molar ratios, such as above about 400:1, would require very low levels of borate addition, such that minimal autocausticization of sodium carbonate would be achieved, despite the high reaction efficiency.

The borate requirements for partial autocausticization can be provided in a variety of inorganic borate forms including boric acid, boric oxide, and sodium borates such as sodium tetraborate and sodium metaborate and the various hydrated forms thereof The preferred way of adding the borate into the process is to mix it into the spent (black) liquor or green liquor. It appears that an important factor in promoting the autocausticization reaction at high molar ratios of sodium to boron is the avoidance of excess sodium hydroxide in the reaction mixture prior to reaction, to avoid premature conversion of the borate reactants into autocausticization reaction products. However, the presence of such sodium hydroxide levels prior to recausticization would not be expected in normal wood pulping operations.

Another embodiment of the present invention is recausticization of a sodium carbonate-containing smelt by successive causticization steps including partial autocausticization of sodium carbonate, followed by a lime causticization step in which additional sodium carbonate is converted back to sodium hydroxide. Such an approach will avoid or minimize many of the problems associated with full autocausticizing such as high dissolved solids, high viscosity and low heating value of the black liquor by avoiding the need for high levels of borate in the recirculating liquor, while providing many of the benefits of autocausticizing. It will reduce the lime recovery circuit energy requirements or reduce the lime consumption in plants which do not recover lime. The process will therefore provide increased operating capacity in plants which are limited by the throughput capacity of an existing lime recovery circuit. The complete recausticization process begins with partial autocausticization of a sodium carbonate-containing smelt with borate, such as in a recovery boiler as described above, thereby producing a reacted portion and an unreacted portion of the smelt. Following partial autocausticization, the smelt is dissolved in water or aqueous liquor to make up an aqueous solution referred to as green liquor, thereby regenerating sodium hydroxide from the reacted portion of the smelt and dissolving the residual sodium carbonate from the unreacted portion. Lime, in the form of calcium oxide or calcium hydroxide, is added to the green liquor, containing the residual sodium carbonate. The lime converts dissolved sodium carbonate to sodium hydroxide and in the process the lime is converted to calcium carbonate. The resulting calcium carbonate mud can then be sent to a conventional lime recovery circuit for conversion back to calcium oxide if desired. The sodium hydroxide-containing solution, which is now referred to as white liquor, is ready for reuse in the delignification process or related pulping circuit.

EXAMPLES

The following examples illustrate the method of this invention.

EXAMPLE 1

Varying amounts of sodium metaborate dihydrate, $NaBO_2 \cdot 2H_2O$, were reacted with 5 gram samples of sodium carbonate at 850° C. in order to simulate autocausticizing. Four different levels of the sodium metaborate were tested (see Table 1). The amounts of sodium metaborate used were 0.5, 1.0, 2.5, and 5.0 grams. A repeat of the 5.0 g level was also run. These mixtures corresponded to 5%, 10%, 26%, and 52% autocausticizing, respectively, based on the stoichiometry proposed by Janson (equation 3). The molar ratios of sodium to boron were 20, 10.6, 4.8 and 2.9, respectively.

TABLE 1

STARTING CONDITIONS

| Experiment | g $Na_2CO_3$ | g $NaBO_2 \cdot 2H_2O$ | Na/B Molar Ratio | % Theoretical Autocausticizing |
|---|---|---|---|---|
| 1 | 5.0 | 0.5 | 20 | 5 |
| 2 | 5.0 | 1.0 | 10.6 | 10 |
| 3 | 5.0 | 2.5 | 4.8 | 26 |
| 4 | 5.0 | 5.0 | 2.9 | 52 |
| 5 | 5.0 | 5.0 | 2.9 | 52 |

The sodium metaborate samples were each heated in tared platinum crucibles to about 200° C. for about an hour to drive off most of the water of crystallization. Then the 5 gram samples of sodium carbonate (anhydrous) were added to each crucible, and the furnace temperature was increased to 850° C. The furnace was held at 850° C. for 30 minutes, and then the samples were removed to a dessicator filled with nitrogen to minimize exposure to carbon dioxide in the atmosphere. The samples were analyzed for carbonate and hydroxide in order to determine the extent of the reaction.

TABLE 2

| | RESULTS | | | |
|---|---|---|---|---|
| | % Autocausticization based on: | | % Efficiency based on: | |
| Experiment | % $CO_3^{2-}$ | % $OH^-$ | % $CO_3^{2-}$ | % $OH^-$ |
| 1 | 17 | 9 | 340 | 180 |
| 2 | 17 | 15 | 170 | 150 |
| 3 | 31 | 31 | 119 | 119 |
| 4 | 47 | 53 | 90 | 102 |
| 5 | 45 | 50 | 87 | 98 |

The results (Table 2) showed that the carbonate level was lowered and the hydroxide content increased as a function of the amount of borate added, indicating that a reaction had taken place, even at high molar ratios of sodium to boron. In fact it was observed that the reaction efficiency increased, substantially exceeding 100%, as the molar ratios of sodium to boron increased. The data suggests that reaction under these conditions may lead to formation of $Na_3BO_3$ (trisodium borate), a different borate composition than was proposed by Janson. The benefit to a mill would be that less borate would be required for a given amount of caustic regenerated, thus reducing chemical costs as well the high amount of $NaBO_2$ deadload which must be carried throughout the pulping/chemical recovery circuit.

EXAMPLE 2

Five gram samples of black liquor were combined with varying amounts of sodium tetraborate ($Na_2B_4O_7$) and heated at 850° C. for 30 minutes. It was estimated that the combustion of black liquor would produce 280 grams $Na_2CO_3$ per kilogram of wet black liquor. The stoichiometric requirement of sodium tetraborate would therefore be 106 grams $Na_2B_4O_7$ per kg wet black liquor based on the following assumed reactions:

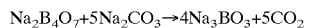

$$Na_2B_4O_7 + 5Na_2CO_3 \rightarrow 4Na_3BO_3 + 5CO_2$$

$$4Na_3BO_3 + 5H_2O \rightarrow Na_2B_4O_7 + 10NaOH$$

The amounts of borate used corresponded to 12, 19 and 48% (partial) autocausticization, 100% (full) autocausticization and 201% autocausticization (double the assumed stoichiometric requirement). The results are shown in Table 3.

TABLE 3

| | | | Actual % Autocaust. based on: | | % Efficiency based on: | |
|---|---|---|---|---|---|---|
| Experiment | Molar Ratio Na/B | Theoretical % Autocaust. | OH | CO3 | OH | CO3 |
| 1 | 21 | 12 | 12 | 41 | 106 | 351 |
| 2 | 14 | 19 | 22 | 48 | 115 | 256 |
| 3 | 5.7 | 48 | 36 | 53 | 76 | 110 |
| 4 | 3 | 100 | 59 | 74 | 58 | 73 |
| 5 | 1.7 | 201 | 80 | 96 | 40 | 48 |

As in example 1, these results show that partial autocausticization is feasible and that the reaction does take place at sodium to boron ratios greater than 3: 1, and can be carried out with greater efficiency under these conditions.

There is the undesirable possibility that if lime and borate react in the lime recausticization stage, insoluble calcium borates could form and precipitate out of solution, thereby being removed from the solution along with the calcium carbonate mud. This would result in undesirable losses of borate and could lead to problems in the operation of the lime kiln. In order to address this problem several tests were run to determine if calcium borate would form during lime recausticization in a simulated kraft process green liquor. The results showed that almost all of the borate reports to the filtrate and that which was found with the solids was likely present as adhering liquor. There was no evidence that calcium borates were formed under the conditions of lime recausticization.

While the descriptions herein relate largely to the chemical recovery process of causticization as applied in the kraft process, the method of this invention is also applicable to other alkali-based processes such as other forms of chemical and semi-chemical pulping of wood and processes which generally require the use of sodium hydroxide in the pulping, bleaching or oxidation of cellulose-based materials. Accordingly, various modifications and changes of the invention can be made and, to the extent that such variations incorporate the spirit of this invention, they are intended to be included within the scope of the appended claims.

What is claimed is:

1. A method for regenerating sodium hydroxide in a wood pulping process comprising the steps of:
   (a) partially autocausticizing a sodium carbonate-containing smelt by reaction with borate, thereby producing a borate-containing partially autotcausticized smelt which includes a reacted portion and an unreacted portion;
   (b) dissolving in aqueous solution said borate-containing partially autocausticized smelt, including said reacted and unreacted portions thereof, to form a borate-containing liquor, thereby regenerating sodium hydroxide and forming dissolved sodium carbonate from said reacted and unreacted portion, respectively, in said borate-containing liquor; and
   (c) introducing lime into said borate-containing liquor so as to react said dissolved sodium carbonate with said lime, thereby regenerating additional sodium hydroxide from said borate-containing liquor in the substantial absence of calcium borate formation.

2. The method according to claim 1 wherein said autocausticization reaction is carried out by adding a limited amount of borate sufficient to provide a boron to carbonate molar ratio of less than about 2:1 and a sodium to boron molar ratio of greater than about 3:1.

3. The method according to claim 2 wherein the boron to carbonate molar ratio is in the range of from about 0.01:1 to 1:1 and the sodium to boron molar ratio is in the range of from about 4:1 to 400:1.

4. The method according to claim 2 wherein the boron to carbonate molar ratio is in the range of from about 0.02:1 to 0.8:1 and the sodium to boron molar ratio is in the range of from about 5:1 to 200:1.

5. The method according to claim 2 wherein the boron to carbonate molar ratio is in the range of from about 0.05:1 to 0.4:1 and the sodium to boron molar ratio is in the range of from about 10:1 to 100:1.

6. The method according to claim 1 wherein said wood pulping process is a kraft process.

7. The method according to claim 1 wherein said borate is added in the form of an inorganic borate compound.

8. The method according to claim 7 wherein said inorganic borate compound is selected from the group consisting of boric acid, boric oxide and sodium borate.

9. The method according to claim 7 wherein said inorganic borate compound is a sodium borate.

10. The method according to claim 9 wherein said sodium borate is selected from the group consisting of sodium metaborate, sodium tetraborate and the hydrated compounds thereof.

11. The method according to claim 9 wherein said sodium borate is sodium tetraborate pentahydrate.

12. The method according to claim 1 wherein said borate is added in the form of sodium borate, the boron to carbonate molar ratio is in the range of from about 0.02:1 to 0.8:1 and the sodium to boron molar ratio is in the range of from about 5:1 to 200:1.

* * * * *

(12) EX PARTE REEXAMINATION CERTIFICATE (4870th)
United States Patent
Bair et al.

(10) Number: US 6,294,048 C1
(45) Certificate Issued: *Oct. 21, 2003

(54) METHOD FOR REGENERATING SODIUM HYDROXIDE BY PARTIAL AUTOCAUSING SODIUM CARBONATE CONTAINING SMELT BY REACTION WITH A BORATE

(75) Inventors: Charles M. Bair, Thousand Oaks, CA (US); Robert B. McBroom, Santa Clarita, CA (US); Honghi N. Tran, Toronto, CA (US)

(73) Assignee: U.S. Borax Inc., Valencia, CA (US)

Reexamination Request:
No. 90/006,367, Aug. 27, 2002

Reexamination Certificate for:
Patent No.: 6,294,048
Issued: Sep. 25, 2001
Appl. No.: 09/238,828
Filed: Jan. 28, 1999

(*) Notice: This patent issued on a continued prosecution application filed under 37 CFR 1.53(d), and is subject to the twenty year patent term provisions of 35 U.S.C. 154(a)(2).

This patent is subject to a terminal disclaimer.

Related U.S. Application Data
(60) Provisional application No. 60/087,779, filed on Jun. 1, 1998.

(51) Int. Cl.$^7$ .............................................. D21C 11/04
(52) U.S. Cl. .................... 162/29; 162/30.1; 162/30.11; 162/37; 162/38; 162/80; 162/90
(58) Field of Search ...................... 162/29, 30.1, 30.11, 162/38, 36, 37, 32, 35, 79, 80, 90

(56) References Cited

U.S. PATENT DOCUMENTS

| | | |
|---|---|---|
| 2,146,093 A | 2/1939 | Ritchie et al. |
| 3,594,270 A | 7/1971 | Schattner |
| 3,766,001 A | 10/1973 | Gleason et al. |
| 3,865,684 A | 2/1975 | Gleason et al. |
| 4,116,759 A | 9/1978 | Janson |
| 4,248,662 A | 2/1981 | Wallick |
| 5,607,548 A | 3/1997 | Pettersson |

FOREIGN PATENT DOCUMENTS

| | | |
|---|---|---|
| CA | 1087355 | 10/1980 |
| EP | 0 369 650 A2 | 5/1990 |
| EP | 0687766 A | 12/1995 |
| FI | 66033 | 12/1982 |
| JP | 57161-189 | 3/1981 |
| SU | 1624082 A1 | 1/1991 |
| SU | 1601258 A1 | 10/1991 |

OTHER PUBLICATIONS

Janson,Jan, "The use of unconventional alkali in cooking and bleaching; Part 1. A new approach to liquor generation and alkalinity", Paperi ja Puu–Papper och Tra, vol. 59, No. 6–7, pp. 425–430,1977.

Janson,Jan & Pekkala,Osmo, "The use of unconventional alkali in cooking and bleaching; Part 2. Alkali cooking of wood with the use of borate", Paperi ja Puu–Papper och Tra, vol. 59, No. 9, pp546–557, 1977.

Janson,Jan & Pekkala,Osmo, "The use of unconventional alkali in cooking and bleaching; Part 3. Oxygen–alkali cooking and bleaching with the use of borate", Paperi ja Puu–Papper och Tra, vol. 60, No. 2, pp. 89–93, 1978.

Janson,Jan, "The use of unconventional alkali in cooking and bleaching; Part 4. Kraft Cooking with the use of borate", Paperi ja Puu–Papper och Tra, vol. 60, No. 5, pp. 349–357, 1978.

Janson,Jan, "The use of unconventional alkali in cooking and bleaching; Part 5. Autocausticizing reactions", Paperi ja Puu–Papper och Tra. vol. 61, No. 1, pp. 20–30, 1979.

Janson,Jan, "The use of unconventional alkali in cooking and bleaching; Part 6. Autocausticizing of sulfur–containing model mixtures & spent liquors", Paperi ja Puu–Papper och Tra, vol. 61, No. 2, pp. 98–103, 1979.

Janson,Jan, "Autocausticizing alkali and its use in pulping and bleaching", Paperi ja Puu–Papper och Tra, vol. 61, No. 8, pp. 495–504, 1979.

Markham,L.D., "Use of Borax in Oxygen Pulping", Trans. Tech. Sect. Canadian Pulp Paper Assoc., vol. 4, No. 4, Tr/110–115, 1978.

Janson,J., "Pulp processes based on autocausticizable borate", Svensk Papperstiding, Finnish Pulp and Paper Institute, Finland, vol. 83, No. 14, pp. 392–395, 1980.

"An evaluation of nonconventional causticizing technology for kraft chemical recovery", A Progress Report to Members of the Institute of Paper Chemistry, Institute of Paper Chemistry, Appleton, Wisconson, pp. 1–66, Jan. 30, 1981.

Janson,Jan and Arhippainen, Bengt, "Mill scale development of the borate–based kraft pulping process", International Conference on Recovery Pulping Chemistry, Vancouver, BC, Canada, pp205–210, 1981.

Kinzer,K., "Wood Pulping with self–causticizing borate", Chemical Abstracts, vol. 100, 23687b, 1983.

Kinzer,K., "Untersuchngnen zum HolsaufschloB mit selbstkaustizierndem Borat", Zellstoff und Papier, vol. 32, No. 5, pp. 202–207, 1983, (with Translation–"Investigation into Wood Decomposition with Autocausticizing Borate").

(List continued on next page.)

*Primary Examiner*—Peter Chin

(57) ABSTRACT

A method is provided for the use of borates in the recausticization of alkali-containing liquors such as those produced in the chemical and semi-chemical pulping of wood and in the oxidation and bleaching of wood pulp. Sodium hydroxide is regenerated from sodium carbonate-containing smelts in such pulp processes by autocausticization through the addition of limited amounts of borate. Autocausticization may be carried out at boron to carbonate molar ratios below 2:1 and at sodium to boron molar ratios exceeding 3:1, resulting in high reaction efficiency. Partial autocausticization using borate may also be combined with conventional lime recausticization for the regeneration of sodium hydroxide from sodium carbonate-containing smelts.

OTHER PUBLICATIONS

Sozen,G. and Pinder,K., "The autocausticizing of sodium carbonate with colemanite", Chemical Abstracts, vol. 107, 136139n, 1985.

Sozen,G. and Pinder, K., "The autoausticizing of sodium carbonate with colemanite", Appl.Chem.Eng.Princ.For.Prod.Relat.Ind., (Pap. Symp.), Am.Inst.Chem.Eng.,Forest Prod. Div., Tacoma,WA,vol. 1, pp. 9–20, 1986.

Janson,Jan and Soderhjelm, Liva, "The viscosity of borate-containing black liquor", Nordic Pulp and Paper Research Journal, No. 2, pp. 107–110, 1988.

Koran, Christine; Wandelt, Pawel; and Kubes, George J., "The effect of temperature on borate–based kraft cooking of black spruce", Chemical Abstracts, vol. 126; 90822m, 1985.

Koran, Christine; Wandelt, Pawel; and Kubes, George J., "The effect of temperature on borate–based kraft cooking of black spruce", Paperi ja Puu–Paper and Timber, vol. 78, No. 9, pp. 541–544, 1996.

Prihoda, Susanne; Wendelt, Pawel; and Kubes, George J., "The effect of borates on kraft, kraft–AQ and soda–AQ cooking of black spruce".

Tran, Honhgi; Mao, Xiaosong; Cameron, John; and Bair, Charles M., "Autocausticizing of smelt with sodium borates", Int. Chem. Recovery conf., Toronto, Canada, TAPPI Press, Atlanta, Georgia, vol. 2, pp. 841–852, Jun. 1, 1998.

Tran, Honghi; Mao, Xiaosong; Cameron, John; and Bair, Charles M., "Autocaussticizing fo smelt with sodium borates", Chemical Abstracts vol. 129, 277541d, 1998.

Emile Carriers, Henri Guiter, and Francis Thubert, "The Action of Boric Anhydride on Sodium Carbonate", Chemical Abstracts, vol. 44, No. 3828, (1950).

Emile Carriers, Henri Guiter, and Francis Thubert, "Action de l'anhydride borique sur le carbonate de sodium", Bull. Soc. Chim. France, 5, 16, p. 796–801, (1949).

"The action of boric oxide on sodium carbonate", an informal translation of Citation No. 29 by Emile Carriere, Henri Guiter and Francis Thubert, "Action de l'anhudride sur le carbonate de sodium", Bull. Soc. Chim. Franc, 5, 16, p. 796–801, (1949).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

* * * * *